US012671085B2

(12) United States Patent
Uchiyama et al.

(10) Patent No.: US 12,671,085 B2
(45) **Date of Patent: *Jun. 30, 2026**

(54) METHOD FOR PRODUCING ACTIVE MATERIAL

(71) Applicant: TOYOTA JIDOSHA KABUSHIKI KAISHA, Toyota (JP)

(72) Inventors: Takayuki Uchiyama, Susono (JP);
Shizuka Masuoka, Atsugi (JP);
Tetsuya Waseda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

This patent is subject to a terminal disclaimer.

(21) Appl. No.: 18/635,098

(22) Filed: Apr. 15, 2024

(65) Prior Publication Data

US 2024/0258514 A1      Aug. 1, 2024

Related U.S. Application Data

(63) Continuation of application No. 17/195,762, filed on Mar. 9, 2021, now Pat. No. 11,990,611.

(30) Foreign Application Priority Data

Apr. 7, 2020      (JP) .................................. 2020-069136

(51) Int. Cl.
*H01M 4/38* (2006.01)
*C01B 33/021* (2006.01)
*H01M 4/02* (2006.01)

(52) U.S. Cl.
CPC ........... *H01M 4/386* (2013.01); *C01B 33/021* (2013.01); *C01P 2002/72* (2013.01);
(Continued)

(58) Field of Classification Search
None
See application file for complete search history.

(56) References Cited

U.S. PATENT DOCUMENTS

| | | | |
|---|---|---|---|
| 11,990,611 B2 * | 5/2024 | Uchiyama ............. C01B 33/021 |
| 2018/0069233 A1 | 3/2018 | Matus et al. |
| 2021/0028450 A1 | 1/2021 | Uchiyama et al. |

FOREIGN PATENT DOCUMENTS

| | | |
|---|---|---|
| JP | 2013008487 A | 1/2013 |
| JP | 2013203626 A | 10/2013 |

(Continued)

OTHER PUBLICATIONS

Takayuki Uchiyama et al., U.S. Appl. No. 17/195,762, filed Mar. 9, 2021.

(Continued)

*Primary Examiner* — Keling Zhang
(74) *Attorney, Agent, or Firm* — Dickinson Wright, PLLC

(57) ABSTRACT

A main object of the present disclosure is to provide a method for producing an active material wherein a volume variation due to charge/discharge is reduced. The present disclosure achieves the object by providing a method for producing an active material, the method comprising steps of: a preparing step of preparing a LiSi precursor including a Si element and a Li element, and a void forming step of forming a void by extracting the Li element from the LiSi precursor by using a Li extracting solvent, and the LiSi precursor includes a crystal phase of $Li_{22}Si_5$.

5 Claims, 1 Drawing Sheet

(52) U.S. Cl.
CPC ...... *C01P 2002/74* (2013.01); *C01P 2006/40* (2013.01); *H01M 2004/021* (2013.01); *H01M 2004/027* (2013.01); *H01M 2220/20* (2013.01)

(56) References Cited

FOREIGN PATENT DOCUMENTS

| | | | |
|---|---|---|---|
| JP | 2017054720 | A | 3/2017 |
| JP | 2021022554 | A | 2/2021 |

OTHER PUBLICATIONS

Takayuki Uchiyama et al., U.S. Appl. No. 17/195,762, Non-Final Office Action dated Oct. 25, 2023.
Takayuki Uchiyama et al., U.S. Appl. No. 17/195,762, Notice of Allowance dated Feb. 20, 2024.

\* cited by examiner

METHOD FOR PRODUCING ACTIVE MATERIAL

RELATED APPLICATIONS

This application is a continuation of U.S. patent application Ser. No. 17/195,762, filed Mar. 9, 2021, which claims priority to JP Patent Application No. 2020-069136, filed Apr. 7, 2020, the entire disclosures of which are incorporated herein in their entireties.

TECHNICAL FIELD

The present disclosure relates to a method for producing an active material.

BACKGROUND ART

In recent years, the development of a battery has been actively carried out. For example, the development of a battery and an active material used for a battery, used for an electric automobile or a hybrid automobile has been advanced in the automobile industry.

As the active material used for the battery, for example, Si based active materials are known. For example, Patent Literature 1 discloses an anode for an all solid state battery using complex particles including Si and carbon, as an anode active material. Patent Literatures 2 and 3 disclose a use of a porous silicon as an anode active material.

CITATION LIST

Patent Literatures

Patent Literature 1: Japanese Patent Application Laid-Open (JP-A) No. 2017-054720
Patent Literature 2: JP-A 2013-008487
Patent Literature 3: JP-A 2013-203626

Summary of Disclosure

Technical Problem

An active material wherein a volume variation due to charge/discharge is small, has been demanded. The present disclosure has been made in view of the above circumstances, and a main object of the present disclosure is to provide a method for producing an active material wherein a volume variation due to charge/discharge is reduced.

Solution to Problem

In order to achieve the object, the present disclosure provides a method for producing an active material, the method comprising steps of: a preparing step of preparing a LiSi precursor including a Si element and a Li element, and a void forming step of forming a void by extracting the Li element from the LiSi precursor by using a Li extracting solvent, and the LiSi precursor includes a crystal phase of $Li_{22}Si_5$.

According to the present disclosure, since the Li element is extracted from the LiSi precursor including a crystal phase of $Li_{22}Si_5$, an active material wherein a volume variation due to charge/discharge is reduced, may be produced.

In the disclosure, the LiSi precursor may have peak "a" of the $Li_{22}Si_5$ at a position of $2\theta=24.8°±0.5°$, and may have peak "b" of $Li_{15}Si_4$ at a position of $2\theta=39.4°±0.5°$ in X-ray diffraction measurement using a CuKα ray, and when an intensity of the peak "a" is regarded as Ia, and an intensity of the peak "b" is regarded as Ib, a peak intensity ratio (Ia/Ib) may be 0.50 or more.

In the disclosure, the preparing step may be a step of preparing the LiSi precursor by mixing a Si raw material including a Si element and a Li raw material including a Li element while applying a mechanical energy.

In the disclosure, the Li extracting solvent may be at least one kind of an ethanol, an 1-propanol, an 1-butanol, an 1-hexanol, and an acetic acid.

In the disclosure, prior to the void forming step, the method may comprise a dispersing step of obtaining a LiSi precursor dispersion by adding a dispersing medium with a specific dielectric constant of 3.08 or less to the LiSi precursor.

In the disclosure, the dispersing medium may be at least one kind of a n-butyl ether, an 1,3,5-trimethylbenzene, and a n-heptane.

Advantageous Effects of Disclosure

The present disclosure exhibits an effect that an active material wherein a volume variation due to charge/discharge is reduced, may be produced.

DESCRIPTION OF EMBODIMENTS

A method for producing an active material in the present disclosure will be hereinafter described in detail.

Figure 1:
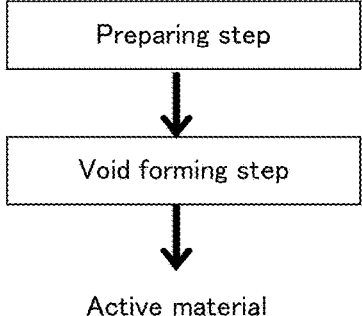
FIG. 1 is a flow diagram illustrating an example of a method for producing an active material in the present disclosure.

FIG. 1 is a flow diagram illustrating an example of a method for producing an active material in the present disclosure. Firstly in the present disclosure, as shown in FIG. 1, a LiSi precursor including a Si element and a Li element, and including a crystal phase of $Li_{22}Si_5$ is prepared. Next, a void is formed by extracting the Li element from the LiSi precursor by using a Li extracting solvent. An active material may be obtained as described above.

According to the present disclosure, since the Li element is extracted from the LiSi precursor including a crystal phase of $Li_{22}Si_5$, an active material wherein a volume variation due to charge/discharge is reduced, may be produced. As above described Patent Literatures 1 to 3, for example, a use of high capacity Si particles as an active material (anode active material) is known. However, when the Si particles are used as the active material, the volume variation due to charge/discharge is increased. On the other hand, in Patent Literature 1, the volume variation is reduced by adjusting the particle size of the active material and providing a predetermined void in the electrode layer. Also, in Patent Literatures 2 and 3, the volume variation is reduced by making the active material particles (anode active material particles) porous. However, there is a margin for further improvement in reducing the volume variation of the active material.

As the result of extensive investigations by the present inventors, it has been found that an active material wherein the volume variation is reduced may be produced by extracting Li element from LiSi alloy (LiSi precursor) including a crystal phase of $Li_{22}Si_5$. Here, since Li has high reactivity and easily alloys with other metal, the uniformity of alloying has not been conventionally examined. On the other hand, in order to increase the uniformity of the alloying, by using a willingly alloyed LiSi precursor (LiSi precursor alloyed until the crystal phase of $Li_{22}Si_5$ is deposited), the volume variation due to charge/discharge was reduced. The reason therefor is presumed that voids were uniformly formed by using the willingly alloyed LiSi precursor.

1. Preparing Step

The preparing step in the present disclosure is a step of preparing a LiSi precursor including a Si element and a Li element.

The LiSi precursor in the present disclosure includes a crystal phase of $Li_{22}Si_5$. "Including a crystal phase of $Li_{22}Si_5$" means that a peak of $Li_{22}Si_5$ is obtained in XRD measurement using a CuKα.

The crystal phase of $Li_{22}Si_5$ has typical peaks at the positions of $2\theta=24.8°$, and $40.8°$, in an XRD measurement using a CuKα ray. These peak positions may be shifted respectively in the range of $\pm0.5°$, and may be shifted in the range of $\pm0.3°$.

Also, the LiSi precursor may include a crystal phase of $Li_{15}Si_4$. The crystal phase of $Li_{15}Si_4$ has typical peaks at the positions of $2\theta=20.3°$, $26.2°$, $39.4°$, $41.2°$, and $42.9°$, in an XRD measurement using a CuKα ray. These peak positions may be shifted respectively in the range of $+0.5°$, and may be shifted in the range of $+0.3°$.

Also, for the LiSi precursor, when an intensity of the peak obtained at the position of $24.8°\pm0.5°$ (peak "a") is regarded as Ia, and an intensity of the peak obtained at the position of $39.4°\pm0.5°$ (peak "b") is regarded as Ib, a peak intensity ratio (Ia/Ib) may be in a predetermined range. Ia/Ib is, for example, 0.50 or more, may be 0.60 or more, may be 0.70 or more, may be 0.75 or more, and may be 1.00 or more.

Also, the LiSi precursor preferably include a crystal phase of Si (diamond type). The crystal phase of Si has typical peaks at the positions of $2\theta=28.4°$, $47.3°$, $56.1°$, $69.2°$, and $76.4°$, in an XRD measurement using a CuKα ray. These peak positions may be shifted respectively in the range of $\pm0.5°$, and may be shifted in the range of $\pm0.3°$. The LiSi precursor may include the crystal phase of Si (diamond type) as a main phase. The "main phase" refers to a crystal phase to which the peak with the highest intensity belongs, in XRD chart.

Also, the composition of the LiSi precursor is not particularly limited. The LiSi precursor may include only a Li element and a Si element, may further include other metal element. The proportion of the total of the Li element and the Si element, to all the metal elements included in the LiSi precursor is, for example, 50 mol % or more, may be 70 mol % or more, and may be 90 mol % or more. In the LiSi precursor, the proportion of the Li element to the total of the Si element and the Li element is, for example, 30 mol % of more, may be 50 mol % or more, and may be 80 mol % or more. When the proportion of the Li element is too low, a desired volume variation inhibiting effect may not be obtained for the active material to be obtained. Meanwhile, the proportion of the Li element is, for example, 95 mol % or less, and may be 90 mol % or less.

The LiSi precursor including the crystal phase of $Li_{22}Si_5$ is thought to be obtained by mixing the Si raw material and the Li raw material uniformly, and alloying the Li element and the Si element well. Therefore, Examples of the method for preparing the LiSi precursor may include a method wherein a Si raw material including a Si element and a Li raw material including a Li element are mixed while applying a mechanical energy. The Si raw material only has to include the Si element, and examples thereof may include a simple substance of Si and an alloy including Si as a main component. Also, the Li raw material only has to include the Li element, and examples thereof may include a simple substance of Li and an alloy including Li as a main component.

Examples of the method for mixing may include mixing using a device such as a grinding device, a ball mill, a disk mill, and a planetary mixer. The mixing condition is not particularly limited as long as a mechanical energy so as to obtain the crystal phase of $Li_{22}Si_5$ may be imparted, and may be appropriately adjusted according to the used device. The mixing condition may be, for example 20 rpm or more and 300 rpm or less, and may be 10 minutes or more and 3 hours or less. Also, to promote the reactivity with Li, the materials may be heated to 100° C. to 200° C. When the applied mechanical energy is too low, the crystal phase of $Li_{22}Si_5$ may not be obtained.

2. Void Forming Step

The void forming step in the present disclosure is a step of forming a void by extracting the Li element from the LiSi precursor by using a Li extracting solvent. Generally, by including this step, an active material including a void within a primary particle may be produced.

The Li extracting solvent is not particularly limited as long as it is a solvent capable of extracting the Li element from the LiSi precursor. Examples of the Li extracting solvent may include primary alcohols such as methanol, ethanol, 1-propanol, 1-butanol, 1-pentanol, and 1-hexanol; secondary alcohols such as 2-propanol, 2-butanol, 2-pentanol, and 2-hexanol; tertiary alcohols such as tert-butyl alcohol; phenolics such as phenol; glycols such as 1,2-ethanediol and 1,3-butanediol; glycol ethers such as propylene glycol monomethyl ether and ethylene glycol monomethyl ether; pyranoses such as b-D-glucopyranose; furanoses such as erythrofuranose; glucoses; and polysaccharides such as fructose. Further, examples of the Li extracting solvent may include acid solutions such as acetic acid, formic acid, propionic acid, and oxalic acid. Among them, the Li extracting solvent is preferably at least one kind of ethanol, 1-propanol, 1-butanol, 1-hexanol and acetic acid. As the Li extracting solvent, only one kind of the above compounds may be used, and two or more kinds thereof may be used. Also, the water content of the Li extracting solvent is preferably low. The water content in the Li extracting solvent is, for example, 100 ppm or less, may be 50 ppm or less, may be 30 ppm or less, and may be 10 ppm or less. When the water content is too high, Si may be oxidized so that deterioration of the battery performance is concerned.

The void forming step may be a method wherein the Li element is extracted by adding the Li extracting solvent to the LiSi precursor. Also, the void forming step may be a method wherein the Li element is extracted by adding the Li extracting solvent to a LiSi precursor dispersion obtained in the dispersing step described later.

The void forming step may involve one step, and may involve two steps. When the void forming step involves one step, for example, the step may be a step wherein the LiSi precursor or the LiSi precursor dispersion, and an arbitrary Li extracting solvent other than the acid solution are reacted. When the void forming step involves two steps, the step may be a step wherein the reacted solution after the first step and the acid solution are reacted. By carrying out the void forming step in two steps, the Li element may be extracted from the LiSi precursor more reliably.

3. Dispersing Step

In the present disclosure, prior to the void forming step, a dispersing step of obtaining a LiSi precursor dispersion by adding a dispersing medium the LiSi precursor, may be included.

The specific dielectric constant of the dispersing medium in the present disclosure is, for example, 3.08 or less. The dispersing medium with the specific dielectric constant of 3.08 or less is usually classified as an aprotic dispersing medium. The specific dielectric constant may be 3.00 or less, and may be 2.50 or less. Meanwhile the specific dielectric constant is, for example, 1.50 or more, may be 1.70 or more, may be 1.90 or more, and may be 2.00 or more. When the specific dielectric constant is too high beyond 3.08, the dispersing medium itself may be reacted with the LiSi precursor and agglutinated so that dispersion may not be carried out preferably. Incidentally, the specific dielectric constant may be measured by, for example, a method described in JIS C 2565 (cavity resonator method).

The dispersing medium may not include a benzene ring, and may include a benzene ring, but the latter is preferable. Also, examples of the dispersing medium may include saturated hydrocarbons such as n-heptane, n-octane, n-decane, 2-ethylhexane, and cyclohexane; unsaturated hydrocarbons such as hexene and heptene; aromatic hydrocarbons such as 1,3,5-trimethylbenzene, toluene, xylene, ethylbenzene, propylbenzene, cumene, 1,2,4-trimethylbenzene, and 1,2,3-trimethylbenzene; and ethers such as n-butylether, n-hexylether, isoamyl ether, diphenylether, methylphenyl ether, and cyclopentylmethyl ether. Among these, n-butylether, 1,3,5-trimethylbenzene and n-heptane are preferable, and particularly 1,3,5-trimethylbenze is preferable. Incidentally, the specific dielectric constant of the n-butylether is 3.08, the specific dielectric constant of the 1,3,5-trimethylbenzene is 2.279, and the specific dielectric constant of the n-heptane is 1.94.

Also, the water content of the dispersing medium is preferably low. The reason therefore is because water react with the LiSi precursor. The water content in the dispersing medium is, for example, 100 ppm or less, may be 50 ppm or less, may be 30 ppm or less, and may be 10 ppm or less.

The LiSi precursor dispersion may be obtained by adding and mixing the dispersing medium to the LiSi precursor. A method for mixing is not particularly limited.

4. Active Material

The active material obtained in the method for producing in the present disclosure is an active material including a void, and examples thereof may include a porous silicon.

Examples of the shape of the active material may include a granular shape. Also, the particle may be a particle of a non-woven fabric shape including Si fiber. "Non-woven fabric shape" refers to a mesh-like shape wherein Si fiber is three-dimensionally entangled. The active material in the non-woven fabric shape may be prepared by carrying out the dispersing step. The average primary particle size of the active material is, for example, 50 nm or more, may be 100 nm or more, and may be 150 nm or more. Meanwhile, the average primary particle size of the active material is, for example, 3000 nm or less, may be 1500 nm or less, and may be 1000 nm or less. Also, the average secondary particle size of the active material is, for example, 1 μm or more, may be 2 μm or more, may be 5 μm or more, and may be 7 μm or more. Meanwhile, the average secondary particle size of the active material is, for example, 60 μm or less, and may be 40 μm or less. Incidentally, the average primary particle size and the average secondary particle size may be determined by observation with a SEM, for example. The number of the sample is preferably large; for example, 20 or more, may be 50 or more, and may be 100 or more. The average primary particle size and the average secondary particle size may be adjusted appropriately by, for example, appropriately changing the manufacturing conditions of the active material, and by carrying out a classifying treatment.

Also, the active material in the present disclosure may have a predetermined void ratio. The void ratio is, for example, 5% or more, may be 10% or more, and may be 20% or more. On the other hand, the void ratio is, for example, 50% or less, and may be 40% or less, and may be 30% or less. The void ratio may be determined by, for example, an observation with a scanning electron microscope (SEM). The number of samples is preferably large, for example, 100 or more. The void ratio may be an average value determined from these samples.

The active material in the present disclosure may be a cathode active material, and may be an anode active material. Also, the use of the active material is not particularly limited, and is preferably used for, for example, an all solid state lithium ion battery.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Comparative Example 1

<Synthesis of Anode Active Material>

A LiSi precursor was obtained by mixing 0.65 g of Si simple substance (particle size: 0.3 μm) and 0.60 g of Li simple substance in an agate mortar under an Ar atmosphere. In a glass reaction vessel under an Ar atmosphere, 1.0 g of the LiSi precursor and 125 ml of 1,3,5-trimethylbenzene as a dispersing medium were mixed using an ultrasonic homogenizer. After mixing, the obtained LiSi precursor dispersion was cooled to 0° C., 125 ml of ethanol was added dropwise, and the mixture was allowed to react for 120 minutes. After the reaction, 50 ml of acetic acid was further added dropwise and allowed to react for 60 minutes. After the reaction, the liquid and the solid-state reactant (anode active material) were separated by suction filtration. The obtained solid-state reactant was dried in vacuum at 120° ° C. for 2 hours to recover an anode active material.

<Synthesis of Solid Electrolyte>

0.550 g of $Li_2S$ (from Furuuchi Chemical Co., Ltd.), 0.887 g of $P_2S_5$ (from Aldrich Co., Ltd.), 0.285 g of LiI (from Nippo Chemicals Co., Ltd.), and 0.277 g of LiBr (from Kojundo Chemical Lab. Co., Ltd.) were mixed in an agate mortar for 5 minutes. To the obtained mixture, 4 g of n-heptane (dehydrated grade, from Kanto Chemical Co., Inc.) was added, and the mixture was subjected to mechanical milling using a planetary ball mill for 40 hours to obtain a solid electrolyte.

<Preparation of Evaluation Battery>

A cathode active material was obtained by carrying out a surface treatment to $LiNi_{1/3}Co_{1/3}Mn_{1/3}O_2$ (from Nichia Chemical Industries Co., Ltd.) with $LiNbO_3$. A cathode mixture was obtained by mixing 1.5 g of this cathode active material, 0.023 g of a conductive auxiliary material (VGCF, from Showa Denko Co., Ltd.), 0.239 g of the above solid electrolyte, 0.011 g of a binder (PVDF, from Kureha Co., Ltd.), and 0.8 g of butylbutyrate (from Kishida Chemical Co., Ltd.) by using an ultrasonic homogenizer (UH-50, from SMT Co., Ltd.).

An anode mixture was obtained by mixing 1.0 g of the anode active material synthesized above, 0.04 g of a conductive auxiliary material (VGCF, from Showa Denko Co., Ltd.), 0.776 g of the above solid electrolyte, 0.02 g of a binder (PVDF, from Kureha Co., Ltd.), and 1.7 g of butyl-butyrate (from Kishida Chemical Co., Ltd.) by using an ultrasonic homogenizer (UH-50, from SMT Co., Ltd.)

Into a ceramic mold of 1 cm$^2$, 0.065 g of the solid electrolyte was inserted, pressed under 1 ton/cm$^2$, to prepare a separator layer (solid electrolyte layer). On one side thereof, 0.018 g of the cathode mixture was inserted, pressed under 1 ton/cm$^2$, to prepare a cathode active material layer. On the opposite side to the cathode active material, 0.0054 g of the anode mixture was inserted, pressed under 4 ton/cm$^2$, to prepare an anode active material layer. Also, an aluminum foil was used for a cathode current collector, and a copper foil was used for an anode current collector. Thereby, an evaluation battery (all solid state battery) was prepared.

Example 1

A LiSi precursor was obtained by mixing 0.65 g of Si simple substance (particle size: 0.3 μm) and 0.60 g of Li simple substance with a grinding device under an Ar atmosphere. The mixing conditions were; number of revolutions of 50 rpm and mixing time of approximately 30 minutes. In a glass reaction vessel under an Ar atmosphere, 6.0 g of the LiSi precursor and 125 ml of 1,3,5-trimethylbenzene as a dispersing medium were mixed using an ultrasonic homogenizer. After mixing, the obtained LiSi precursor dispersion was cooled to 0° C., 125 ml of ethanol was added dropwise, and the mixture was allowed to react for 120 minutes. After the reaction, 50 ml of acetic acid was further added dropwise and allowed to react for 60 minutes. After the reaction, the liquid and the solid-state reactant (anode active material) were separated by suction filtration. The obtained solid-state reactant was dried in vacuum at 120° C. for 2 hours to recover an anode active material. An evaluation battery was prepared in the same manner as in Comparative Example 1 except that the obtained anode active material was used.

Example 2

An anode active material and an evaluation battery were prepared in the same manner as in Example 1 except that the particle size of the Si simple substance was changed to 0.5 μm.

Example 3

An anode active material and an evaluation battery were prepared in the same manner as in Example 1 except that the particle size of the Si simple substance was changed to 0.4 μm.

Example 4

An anode active material and an evaluation battery were prepared in the same manner as in Example 1 except that the particle size of the Si simple substance was changed to 0.1 μm.

[Evaluation]
<XRD Measurement>

Figure 2:
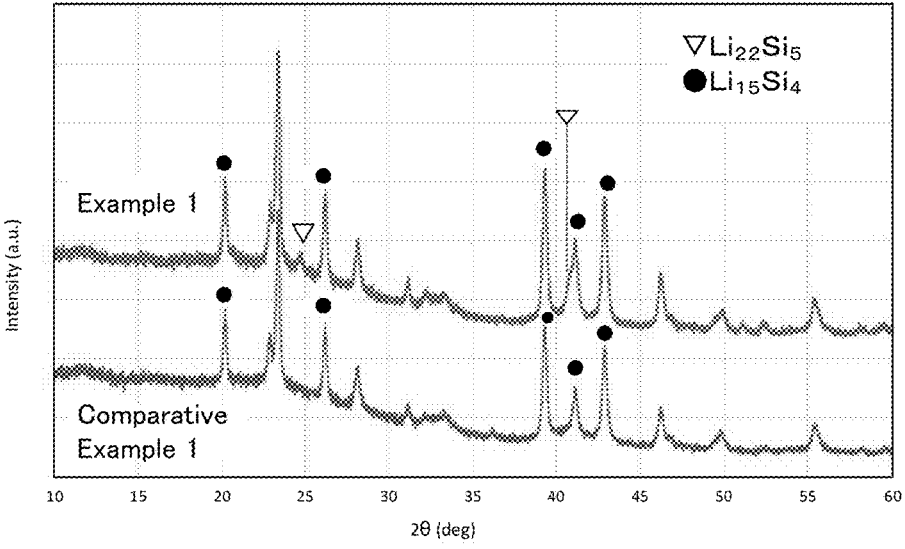
FIG. 2 is the result of an XRD measurement for the anode active materials obtained in Example 1 and Comparative Example 1.

An X-ray diffraction (XRD) measurement using a CuKα ray was carried out for the LiSi precursor obtained in Examples 1 to 4 and Comparative Example 1. The XRD data of Example 1 and Comparative Example 1 are shown in FIG. 2. As shown in FIG. 2, it was confirmed that the LiSi precursor of Example 1 included multiphase; the crystal phase of $Li_{22}Si_5$ and the crystal phase of $Li_{15}Si_4$. As the typical peaks of the crystal phase of $Li_{22}Si_5$, peaks were confirmed at positions of $2\theta=24.8°$, and $40.8°$. Also, as the typical peaks of the crystal phase of $Li_{15}Si_4$, peaks were confirmed at positions of $2\theta=20.3°$, $26.2°$, $39.4°$, $41.2°$, and $42.9°$. Meanwhile, the peaks of the $Li_{22}Si_5$ were not confirmed in the LiSi precursor of Comparative Example 1. The peak intensity ratio (Ia/Ib) was calculated from the XRD data. The results are shown in Table 1.
<Volume Variation>

The volume variation of the active material was evaluated by measuring the confining pressure increase due to charge/discharge, of the evaluation batteries. Specifically, the batteries were evaluated as described below. The evaluation battery obtained in Examples 1 to 4 and Comparative Example 1 were CC/CV charged at 0.245 mA until 4.55 V, and then, CC/CV discharged at 0.245 mA until 3.0 V. The confining pressure of the battery was monitored during the first charge, and the confining pressure at 4.55 V was measured. A comparative evaluation was carried out by setting the confining pressure in Comparative Example 1 as 100%.

TABLE 1

|  | Peak intensity ratio (Ia/Ib) | Confining pressure increase (%) |
|---|---|---|
| Comp. Example 1 | — | 100 |
| Example 1 | 0.62 | 49 |
| Example 2 | 0.68 | 46 |
| Example 3 | 0.53 | 41 |
| Example 4 | 0.76 | 38 |

As shown in Table 1, Comparted to Comparative Example 1, the confining pressure increase was remarkably suppressed in Examples 1 to 4. From this, it was confirmed that an active material wherein a volume variation due to charge/discharge was reduced, may be produced by extracting the Li element from the LiSi precursor including a crystal phase of $Li_{22}Si_5$.

Reference Example

An anode active material was prepared in the same manner as in Example 1 except that the number of revolutions in the mixing condition using the grinding device was changed to 30 rpm. An X-ray diffraction (XRD) measurement using a CuKα ray was carried out for the obtained anode active material. The result is shown in FIG. 3.

Figure 3:
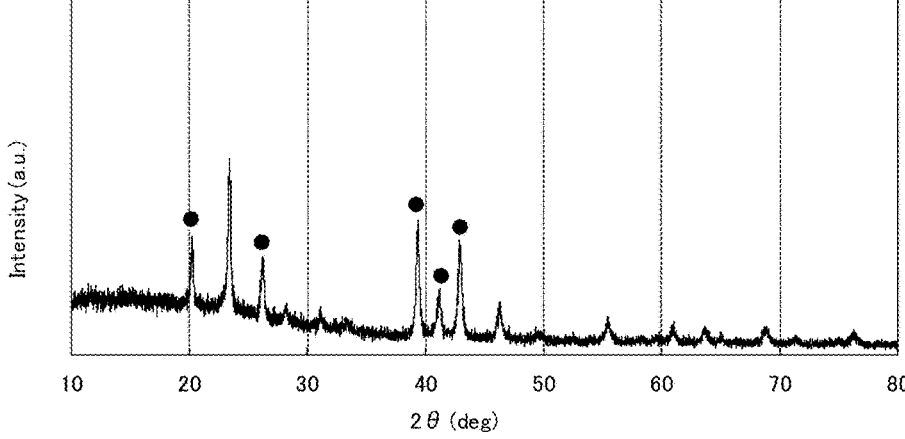
FIG. 3 is the result of an XRD measurement for the anode active material obtained in Reference Example.

As shown in FIG. 3, the typical peaks of the crystal phase of $Li_{22}Si_5$ were not obtained. As described above, it was suggested that the crystal phase of $Li_{22}Si_5$ could not be obtained when the mechanical energy applied at mixing was too low.

The invention claimed is:
1. A method for producing an active material, the method comprising steps of:

a preparing step of preparing a LiSi precursor including a Si element and a Li element, and a void forming step of forming a void by extracting the Li element from the LiSi precursor by using a Li extracting solvent, and the LiSi precursor includes a crystal phase of $Li_{22}Si_5$, wherein the LiSi precursor has peak "a" of the $Li_{22}Si_5$ at a position of $2\theta=24.8°=0.5°$, and has peak "b" of $Li_{15}Si_4$ at a position of $2\theta=9.4°+0.5°$ in X-ray diffraction measurement using a CuKα ray, when an intensity of the peak "a" is regarded as Ia, and an intensity of the peak "b" is regarded as Ib, a peak intensity ratio (Ia/Ib) is 0.50 or more, and the active material has a void ratio of 5% or more and 50% or less.

2. The method for producing an active material according to claim 1, wherein the preparing step is a step of preparing the LiSi precursor by mixing a Si raw material including a Si element and a Li raw material including a Li element while applying a mechanical energy.

3. The method for producing an active material according to claim 1, wherein the Li extracting solvent is at least one kind of an ethanol, an 1-propanol, an 1-butanol, an 1-hexanol, and an acetic acid.

4. The method for producing an active material according to claim 1, wherein, prior to the void forming step, the method comprises a dispersing step of obtaining a LiSi precursor dispersion by adding a dispersing medium with a specific dielectric constant of 3.08 or less to the LiSi precursor.

5. The method for producing an active material according to claim 4, wherein the dispersing medium is at least one kind of a n-butyl ether, an 1,3,5-trimethylbenzene, and a n-heptane.

\* \* \* \* \*